(12) United States Patent
Piasecki et al.

(10) Patent No.: US 9,045,074 B2
(45) Date of Patent: Jun. 2, 2015

(54) DRIVER ALERTS

(71) Applicant: GM Global Technology Operations LLC, Detroit, MI (US)

(72) Inventors: Jeffrey S. Piasecki, Rochester, MI (US); Charles A. Green, Canton, MI (US); Debbie E. Nachtegall, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 352 days.

(21) Appl. No.: 13/712,134

(22) Filed: Dec. 12, 2012

(65) Prior Publication Data

US 2014/0159887 A1   Jun. 12, 2014

(51) Int. Cl.
   *B60Q 1/00*   (2006.01)

(52) U.S. Cl.
   CPC ........................................ *B60Q 1/00* (2013.01)

(58) Field of Classification Search
   None
   See application file for complete search history.

(56) References Cited

U.S. PATENT DOCUMENTS

| 4,492,952 | A | * | 1/1985 | Miller | 340/439 |
| 4,835,512 | A | * | 5/1989 | Bratton | 340/457.2 |
| 6,703,999 | B1 | * | 3/2004 | Iwanami et al. | 345/158 |
| 2006/0023315 | A1 | * | 2/2006 | Robinson | 359/630 |
| 2009/0303604 | A1 | * | 12/2009 | Martin | 359/630 |
| 2013/0131906 | A1 | * | 5/2013 | Green et al. | 701/23 |
| 2014/0300458 | A1 | * | 10/2014 | Bennett | 340/439 |

* cited by examiner

*Primary Examiner* — Travis Hunnings
(74) *Attorney, Agent, or Firm* — Cantor Colburn LLP

(57) ABSTRACT

A driver alert system includes a computer processor disposed in a vehicle. The computer processor is configured to receive driver attention data over a vehicle network during a driving event. The computer processor executes logic to process the driver attention data and evaluate the driver attention data for a triggering event. The system also includes a steering wheel unit disposed in the vehicle and lights that are integrated on a front windshield-facing surface of a steering wheel of the steering wheel unit. The lights are positioned at an angle to reflect light off of a front windshield of the vehicle. The system also includes a controller disposed in the steering wheel unit. The controller is communicatively coupled to the lights and the vehicle network. The controller receives a request from the computer processor to activate the lights when the triggering event has occurred.

20 Claims, 2 Drawing Sheets

DRIVER ALERTS

FIELD OF THE INVENTION

The subject invention relates to vehicle control systems and, more particularly, to a driver alert system and method.

BACKGROUND

Distracted driving may be defined as behavior in which an operator devotes less than his or her full attention to the road or any conditions that may impact the ability to safely reach his or her destination. Some vehicle manufacturers have built in to their vehicles some type of driver distraction system, such as monitoring devices that gather operator eye and/or head movements, or lack thereof, to determine whether an operator is distracted. These systems alert the operator using various means, such as cluster tell tales, heads up display (HUD) indicators, and/or haptic seat alerts. While these systems can be useful in redirecting a driver's attention back to the road, they can be somewhat intrusive for frequent use.

Accordingly, it is desirable to provide a way to redirect a driver's attention back to the road using a less intrusive alert system.

SUMMARY OF THE INVENTION

In one exemplary embodiment of the invention, a driver alert system for a vehicle is provided. The system includes a computer processor disposed in a vehicle. The computer processor is configured to receive driver attention data over a vehicle network during a driving event. The system also includes logic executable by the computer processor to process the driver attention data and evaluate the driver attention data for a triggering event. The system further includes a steering wheel unit disposed in the vehicle and lights integrated on a front windshield-facing surface of a steering wheel of the steering wheel unit. The lights are positioned at an angle to reflect light off of a front windshield of the vehicle. The system also includes a controller disposed in the steering wheel unit. The controller is communicatively coupled to the lights and the vehicle network. The controller receives a request from the computer processor to activate the lights when the triggering event has occurred.

In another exemplary embodiment of the invention, a method of alerting a driver of a vehicle is provided. The method includes receiving, via a computer processor disposed in a vehicle, driver attention data over a vehicle network during a driving event. Upon determining an occurrence of a triggering event from the driver attention data, the method includes sending a request to a controller to activate lights configured to alert an operator of the vehicle. The lights are integrated on a front windshield-facing surface of a steering wheel. The lights are positioned at an angle to reflect light off of a front windshield of the vehicle and toward the operator.

In yet another exemplary embodiment of the invention, a computer program product for alerting a driver of a vehicle is provided. The computer program product includes a storage medium having computer-readable instructions embodied thereon, which when executed by a computer processor, causes the computer processor to implement a method. The method includes receiving driver attention data over a vehicle network during a driving event. Upon determining an occurrence of a triggering event from the driver attention data, the method includes sending a request to a controller to activate lights configured to alert an operator of a vehicle. The lights are integrated on a front windshield-facing surface of a steering wheel. The lights are positioned at an angle to reflect light off of a front windshield of the vehicle and toward the operator.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
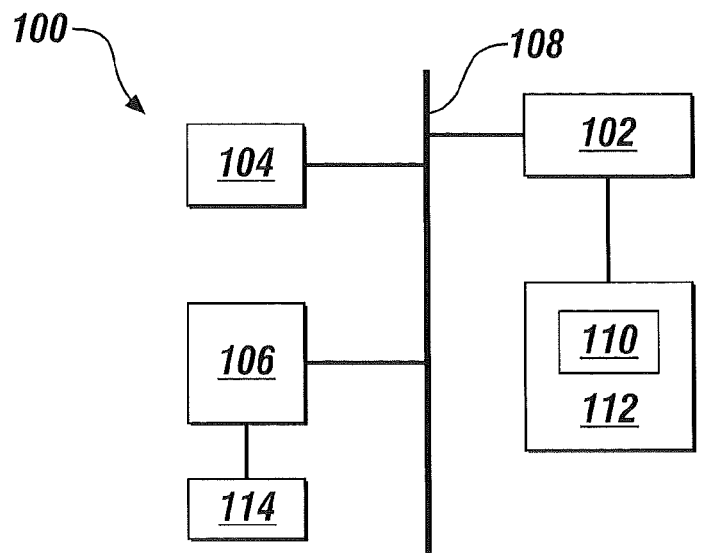
FIG. 1 is a block diagram of a system upon which driver alerts may be implemented in an embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, a driver alert system and process are provided. The driver alerts provide a means to attract a distracted driver's attention in a way that is less obtrusive than current alert systems. The driver alert system includes steering wheel-mounted lights that are mounted on or integrated with a front windshield-facing side of a steering wheel. The lights are activated when it is determined that the driver may be distracted. The lights are positioned on an angle such that they emit light that is reflected off of the front windshield and toward the driver's eyes or face, thereby alerting the driver to return his or her focus to the road ahead. These and other features of the driver alert system will now be described.

Turning now to FIG. 1, a system 100 upon which driver alerts may be implemented will now be described. The system 100 includes a computer processor 102, a driver monitoring system 104, and a steering wheel unit 106, each of which is communicatively coupled to a vehicle network 108.

The computer processor 102 may be implemented, e.g., as an application specific integrated circuit (ASIC), an electronic circuit, or a processor (shared, dedicated, or group). The computer processor 102 executes logic 110, which may be one or more software or firmware programs, a combinational logic circuit, and/or other suitable components that provide the described functionality. The logic 110 processes driver attention data and evaluates the data to determine whether a triggering event has occurred. The logic 110 may be stored in a memory device 112 of the vehicle.

The memory device 112 may include any type of memory, such as hard disk memory, virtual memory, random access memory, and cache memory.

The driver monitoring system 104 includes sensors that monitor a driver's attentiveness. In an embodiment, the driver monitoring system 104 performs tracking of head positioning and/or eye movement via a digital camera that incorporates infrared sensors (e.g., charged coupled devices (CCDs) or complementary metal oxide semiconductors (CMOSs)). The driver monitoring system 104 may be integrated on the vehicle cluster (not shown) or the steering wheel unit 106. If implemented on the vehicle cluster, the driver monitoring system 104 is communicatively coupled to the computer processor 102 through the vehicle network 108. In an embodiment, the driver monitoring system 104 sends driver attention data to computer processor 102 over network 108. The driver attention data may be raw data collected by the digital camera and sensors, such as eye and/or head position data, eye and/or head movement data, or a combination thereof. The driver attention data may be continuously collected by the driver monitoring system 104 over the course of a driving cycle.

The steering wheel unit 106 includes a steering wheel and shaft. A driver alert device 114 is communicatively coupled to the steering wheel unit 106. The driver alert device 114 includes a controller communicatively coupled to lights. The controller may be implemented in hardware, software, or a combination thereof. The lights may be implemented as light emitting diodes (LEDs) and may be one color or multi-colored. The controller is configured to receive requests from the computer processor 102 to activate the lights when a triggering event occurs, as will be described herein.

The network 108 is integrated with the vehicle and may be part of a physically wired network, a wireless network, or a combination thereof. In one embodiment, the network 108 may be a local area network that communicatively couples electronic components of the vehicle with the computer processor 102. If the network 108 is part of a wireline network, the network 108 may include one or more serial data buses or other data connections.

In operation, the driver monitoring device 104 monitors an operator's head movements and/or eye positions and sends raw data to the computer processor 102. Logic 110 executing on the computer processor 102 evaluates the data to determine if a triggering event has occurred. In an embodiment, a triggering event may be defined as a threshold collective amount of time within a defined time period in which the operator's eyes or head have been diverted from a front facing angle with respect to the vehicle. For example, within an interval of 5 seconds, the operator's eyes or head have been diverted from a forward facing position for a total of 3 seconds. Alternatively, the triggering event may be defined as a threshold number of times that the operator has diverted his/her attention from the forward facing position within a defined period of time. It will be understood that the triggering event may be defined using any type of criteria indicative of a distracted event. The above examples are provided for illustrative purposes and are not to be construed as limiting in scope.

Figure 2:
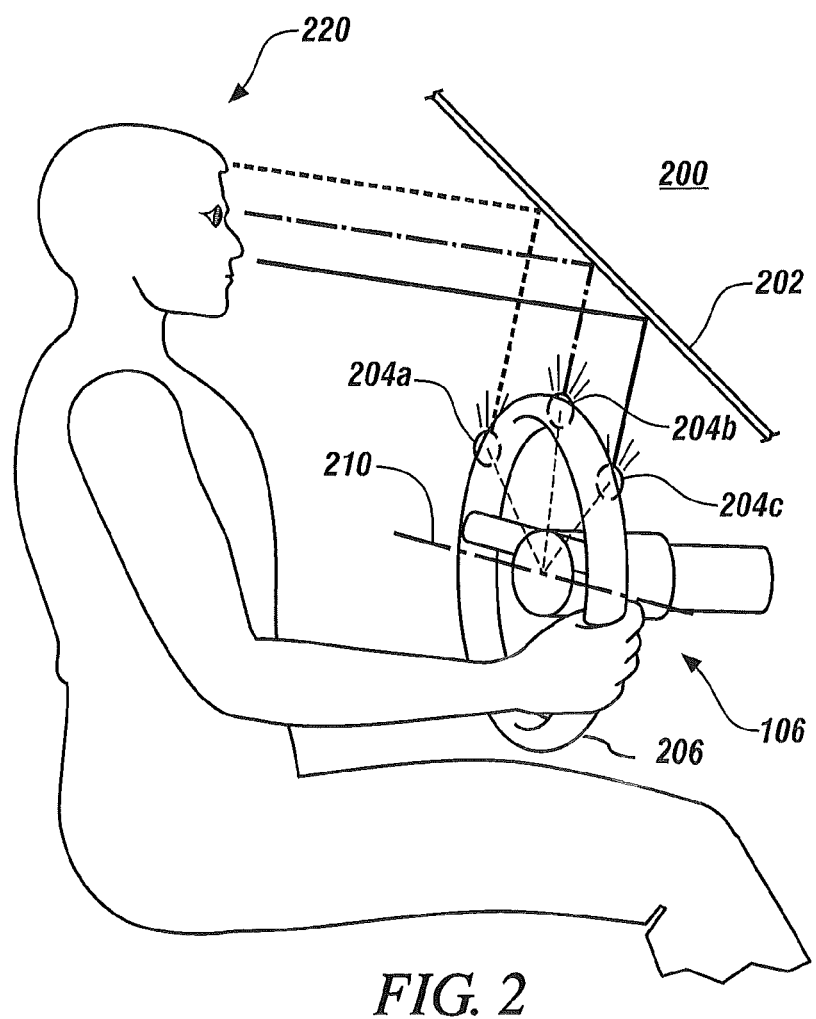
FIG. 2 is a diagram illustrating a vehicle cabin and steering wheel unit through which driver alerts may be implemented in an embodiment.

Turning now to FIG. 2, diagram of a vehicle cabin 200 including the steering wheel unit 106 through which the driver alerts may be implemented will now be described.

The cabin includes a front windshield 202, the steering wheel unit 106, and a vehicle operator 220 seated in a driver side seat of the vehicle. As shown in FIG. 2, three lights 204a-204c are integrated in a steering wheel 206 of the steering wheel unit 106. The lights 204a-204c are mounted on a front windshield-facing side 208 of the steering wheel 206. While three lights 204a-206c are shown in FIG. 2, it will be understood that a greater or fewer number of lights may be implemented by the driver alert system in order to realize the advantages of the embodiments. In an exemplary embodiment, the three lights 204a, 204b, and 204c are mounted in three different circumferential locations or positions on the steering wheel. A first light 204a is disposed at an approximate 45 degree angle with respect to a horizontal axis 210 that intersects a diameter of the steering wheel 206. A second light 204b is disposed at an approximate 90 degree angle with respect to the horizontal axis 210, and a third light 204c is disposed at an approximate 135 degree angle with respect to the horizontal axis 210. These positions are also referred to as ten o'clock, twelve o'clock, and two o'clock positions, respectively.

By placing these lights at these locations on the steering wheel 206, the driver alert system enables at least one set of the lights to be in a position to reflect off of the front windshield 202 when the steering wheel 206 is turned to navigate curves. In addition, since an operator's hands cannot cover more than two of the positions at one time, having three lights eliminates the possibility that the operator's hands might inadvertently cover the lights, which would otherwise prevent preventing the lights from reflecting off of the front windshield 202.

As indicated above, the lights 204a-204c are positioned on the steering wheel 206 in a circumferential position and at an angle such that the light emitted therefrom reflects off of the front windshield 202 and toward the operator's face. The particular angle selected for the lights 204a-204c will depend, in part, upon the existing angle of the front windshield 202. The lights 204a-204c may be configured to emit one color of light or may be multi-colored.

The controller of the driver alert device 114 may be integrated in the steering wheel 206 or the steering wheel shaft. In an embodiment, the logic 110 may be configured to activate the lights 204a-204c as a continuous stream of light or may intermittently flash the lights 204a-204c on and off. In addition, the logic 110 may be configured to adjust an intensity of the lights 204a-204c depending on ambient lighting conditions. For example, during daylight hours, the logic 110 may direct the controller to flash a high intensity light, while during evening hours, the logic 110 may direct the controller to flash a low intensity light. In another embodiment, the logic 110 is configured to monitor the driver attention data from the driver monitoring system 104 and alter the color of the lights 204a-204c based on continued distractibility of the driver (e.g., if the lights flash white three times with no change in the driver's distractibility, the lights will then flash red to gain the driver's attention).

Figure 3:
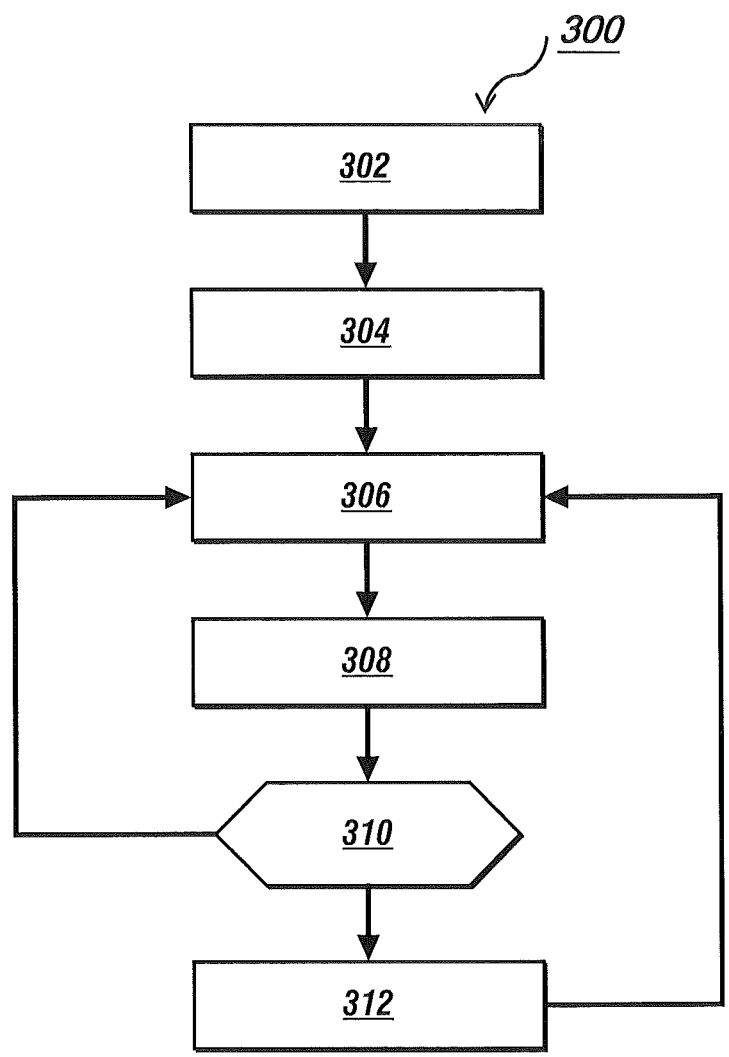
FIG. 3 is a flow diagram describing a process for implementing driver alerts in an embodiment.

Turning now to FIG. 3, a flow diagram describing a process 300 for implementing driver alerts will now be described in an embodiment.

At step 302, lights 204a-204c are mounted or integrated on a front windshield-facing side 208 of the steering wheel 206.

At step 304, the lights 204a-204c are positioned at an angle to reflect light off of front windshield 202 toward the eyes or face of the operator 220.

At step 306, the computer processor 102 receives driver attention data from the driver monitoring system 104 during a driving event.

At step 308, the logic 110 evaluates the driver attention data to determine whether a triggering event has occurred. The triggering event signifies the driver is driving in a distracted state.

At step 310, the logic determines whether a triggering event has occurred. If not, the process 300 returns to step 306 and the computer processor 102 continues to receive driver attention data. Otherwise, if a triggering event has occurred, the logic 110 directs the controller of the driver alert device 114 to activate the lights 204a-204c. The process 300 then returns to step 306 where the computer processor 102 continues to receive driver attention data.

Technical effects of the invention provide a driver alert system 200 to attract a distracted driver's attention in a way that is less obtrusive than current alert systems. The driver alert system 200 includes steering wheel-mounted lights 204a-204c that are mounted on or integrated with a front windshield-facing side of a steering wheel 206. The lights 204a-204c are activated when it is determined that the driver may be distracted. The lights 204a-204c are positioned on an angle such that they emit light that is reflected off of the front windshield and toward the driver's eyes or face, thereby alerting the driver to return focus to the road ahead.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A driver alert system for a vehicle, comprising:
   a computer processor disposed in the vehicle, the computer processor configured to receive driver attention data over a vehicle network during a driving event;
   logic executable by the computer processor to process the driver attention data and evaluate the driver attention data for a triggering event;
   a steering wheel unit disposed the vehicle;
   lights integrated on a front windshield-facing surface of a steering wheel of the steering wheel unit, the lights positioned at an angle to reflect light off of a front windshield of the vehicle; and
   a controller disposed in the steering wheel unit, the controller communicatively coupled to the lights and the vehicle network, the controller receiving a request from the computer processor to activate the lights when the triggering event has occurred.

2. The system of claim 1, wherein the driver attention data is received from a driver monitoring system disposed in the vehicle, and the driver attention data includes at least one of eye tracking data and head position data.

3. The system of claim 1, wherein a first light of the lights is disposed substantially at a 45 degree angle with respect to a horizontal axis of the steering wheel, a second light of the lights is disposed substantially at a 90 degree angle with respect to the horizontal axis, and a third light of the lights is disposed substantially at a 135 degree angle with respect to the horizontal axis.

4. The system of claim 1, wherein the logic is configured to adjust an intensity level of the lights based on an ambient lighting condition.

5. The system of claim 1, wherein the logic is configured to intermittently flash the lights on and off.

6. The system of claim 1, wherein the logic is configured to monitor the driver attention data over a time period and to change a color of the lights when the driver attention data indicates continued distractibility of the driver.

7. The system of claim 1, wherein the computer processor forms part of an active safety electronic control unit of the vehicle.

8. A method of alerting a driver of a vehicle, comprising:
   receiving, via a computer processor disposed in the vehicle, driver attention data over a vehicle network during a driving event;
   upon determining an occurrence of a triggering event from the driver attention data, sending a request to a controller to activate lights configured to alert an operator of the vehicle, the lights integrated on a front windshield-facing surface of a steering wheel, the lights positioned at an angle to reflect light off of a front windshield of the vehicle and toward the operator.

9. The method of claim 8, wherein the driver attention data is received from a driver monitoring system disposed in the vehicle, and the driver attention data includes at least one of eye tracking data and head position data.

10. The method of claim 8, wherein a first light of the lights is disposed substantially at a 45 degree angle with respect to a horizontal axis of the steering wheel, a second light of the lights is disposed substantially at a 90 degree angle with respect to the horizontal axis, and a third light of the lights is disposed substantially at a 135 degree angle with respect to the horizontal axis.

11. The method of claim 8, further comprising:
    adjusting an intensity level of the lights based on an ambient lighting condition.

12. The method of claim 8, further comprising:
    intermittently flash the lights on and off.

13. The method of claim 8, further comprising:
    monitoring the driver attention data over a time period and changing a color of the lights when the driver attention data indicates continued distractibility of the operator.

14. The method of claim 8, wherein the computer processor forms part of an active safety electronic control unit of the vehicle.

15. A computer program product comprising a non-transitory computer-readable storage medium having instructions embodied thereon, which when executed by a computer processor disposed in a vehicle, causes the computer processor to implement a method, the method including:
    receiving driver attention data over a vehicle network during a driving event;
    upon determining an occurrence of a triggering event from the driver attention data, sending a request to a controller to activate lights configured to alert an operator of the vehicle, the lights integrated on a front windshield-facing surface of a steering wheel, the lights positioned at an angle to reflect light off of a front windshield of the vehicle and toward the operator.

16. The computer program product of claim 15, wherein the driver attention data is received from a driver monitoring system disposed in the vehicle, and the driver attention data includes at least one of eye tracking data and head position data.

17. The computer program product of claim 15, wherein a first light of the lights is disposed substantially at a 45 degree angle with respect to a horizontal axis of the steering wheel, a second light of the lights is disposed substantially at a 90 degree angle with respect to the horizontal axis, and a third light of the lights is disposed substantially at a 135 degree angle with respect to the horizontal axis.

18. The computer program product of claim 15, wherein the method further comprises:
  adjusting an intensity level of the lights based on an ambient lighting condition.

19. The computer program product of claim 15, wherein the method further comprises:
  intermittently flash the lights on and off.

20. The computer program product of claim 15, wherein the method further comprises:
  monitoring the driver attention data over a time period and changing a color of the lights when the driver attention data indicates continued distractibility of the operator.

* * * * *